Patented July 26, 1938

2,124,820

UNITED STATES PATENT OFFICE 2,124,820

FOODSTUFFS, SUITABLE FOR CHICKENS AND THE LIKE

Esther Hellinger, Rehovoth, Palestine

No Drawing. Application July 23, 1937, Serial No. 155,320. In Great Britain July 23, 1936

9 Claims. (Cl. 99—4)

This invention relates to the preparation of nutritive foodstuffs, specially suited for the feeding of chickens and other delicate birds, and aims at utilizing milk whey, which is usually available in such quantities as to be regarded frequently as a waste product. It is further directed to the production of such highly nutritive products at very low cost.

The invention consists in preparing nutritive chicken and like foodstuffs by the lactic fermentation of the milk whey and its association with vegetable protein in suitable proportions for the purpose referred to above.

The invention also consists in the method of preparing foodstuffs and utilizing milk whey according to which a mixture of milk whey and vegetal protein is subjected to fermentation by lactic bacteria or ferments to secure a product rich in digestible proteins with sugar and other carbohydrates and having a substantial lactic acid content.

The invention also consists in a method according to either of the two preceding paragraphs utilizing proteinaceous materials of the kind set forth and preferably soya meal, before or after removal of fat and lecithin therefrom.

The invention also consists in improvements relating to chicken food and the like, substantially as herein described, comprising both processes or methods and products.

In carrying the invention into effect in one form by way of example, 20 parts of milk whey are mixed with 4 to 5 parts of soya meal (about 48% protein). The mixture is sterilized according to any known procedure and inoculated with about 5% or more of a culture of a lactic acid producing bacterium or a mixture of two or more of them, especially as referred to below. After the mass has been kept at 37° C. for five to six days, the preparation is ready for use. The amounts of lactic acid and total nitrogen in such a preparation are about 3 anl 1.5% respectively.

The product may be subjected to evaporation and more or less dried if desired.

General

Chicken feeding with preparations as indicated above has been carried out for a substantial period with good success. The rate of development of the chickens, especially in the first days of their life, was greater when food of the above kind was utilized, which may perhaps be due at least in part to the presence of vitamin $B_2$ (lactoflavin) which the milk whey contains, as well as sugar (lactose) of the milk and carbohydrates of the soya. I also found that coccidiosis was cured by the food to a large extent.

In a preparation as referred to above, part of the soya carbohydrate as well as of the milk-sugar is apparently fermented into lactic acid. Since not all the lactic acid producing organisms are able to attack both soya and milk carbohydrates, sometimes it is necessary or desirable to use a mixture of say two bacteria or bacterial strains, one more suitable for the fermentation of lactose, another for the conversion of soya sugar into lactic acid. A mixture of e. g., *B. delbrückii* (especially active on soya carbohydrates) and *Thm. helveticum*, has proved very efficient, but certain other organisms as *Thermobacterium lactis* may be used alone with substantially equal effect.

The fat and lecithin content of the soya meal is not essential for the preparation of the above food, so that instead of natural soya meal, one may use the meal which is left after the extraction of oil and lecithin. In this way the production of the new foodstuff may be achieved at a very low price.

In place of soya, peanuts, linseed cake or the like may be used, i. e., proteinaceous vegetal substances liberal in protein and carbohydrates; and preferably also vitamins, whilst of low cost.

Fermentation of milk whey alone, for example, by converting the sugar biologically into lactic acid, does not, due to the lack of other constituents, furnish a complete food. As indicated above, protein, preferably of high digestibility and relatively low molar weight, is required. The latter property apparently also allows the percentage of lactic acid to increase above the amount formed with whey alone, because of the buffering action of the protein.

I claim:

1. A process for the production of foodstuffs, which comprises preparing a mixture of milk-whey with vegetal material rich in relatively low molecular weight protein and in fermentable carbohydrate, inoculating the mixture with lactic-acid producing organisms and allowing the mixture to ferment.

2. A process according to claim 1 wherein said vegetal material comprises soya.

3. A process according to claim 1 wherein said material comprises soya meal, the mixture subjected to fermentation comprising a greater quantity of the milk whey.

4. A process according to claim 1 which comprises forming a mixture of 20 parts milk whey to approximately 5 parts of soya meal, sterilizing the mixture and inoculating it with about 5% and upwards of a culture of lactic-acid producing bacteria, maintaining the mass at a temperature promoting fermentation, until lactic-acid and total nitrogen contents of about 3% and 1.5% respectively are secured.

5. A process according to claim 1 wherein a mixture of bacteria of different specific activties in relation to the carbohydrates in the mixture is employed for the fermentation.

6. In the manufacture of foodstuffs, fermenting milk whey together with sugar from an extraneous source by lactic-acid producing organisms in the presence of low molecular weight protein.

7. A process according to claim 1, including concentration by evaporation of the fermented product.

8. A process according to claim 1 in which the vegetal material is the soya meal residue from extraction of natural soya meal to remove oil and lecithin.

9. A process according to claim 1 in which the vegetal material employed is within the group which consists of soya, peanuts, linseed cake, liberal in proteins, carbohydrates and containing vitamins.

ESTHER HELLINGER.